Sept. 18, 1962  W. F. ZIMMERLI  3,054,148
PROCESS OF PRODUCING A PERFORATED THERMOPLASTIC SHEET
Filed Dec. 6, 1951

INVENTOR.
William F. Zimmerli
BY
Donald F. McCarthy
ATTORNEY.

United States Patent Office 3,054,148
Patented Sept. 18, 1962

3,054,148
PROCESS OF PRODUCING A PERFORATED
THERMOPLASTIC SHEET
William Frederick Zimmerli, Windsor Park Hotel,
2300 Connecticut Ave. NW., Washington, D.C.
Filed Dec. 6, 1951, Ser. No. 260,222
1 Claim. (Cl. 18—56)

The present invention relates to novel ornamental or decorative thermoplastic sheet products and to a method or process for manufacturing such products. More particularly the invention contemplates the provision of a process for treating a continuous sheet or film of thermoplastic material to provide perforated or indented sheet products of a decorative nature which are ideally suited for use as simulated fabrics and woven materials.

Shaping or ornamentation of thermoplastic blanks has heretofore been effected by the use of devices such as gang punches, dies, molds, calender rolls and similar arrangements capable of imparting a predetermined shape or pattern to a sheet of thermoplastic material which is first heated or otherwise treated to render the material plastic or semi-fluid. The processes heretofore customarily employed in utilizing these arrangements provide relatively little flexibility with respect to the size and character of the perforations or indentations of the design but are for the most part restricted to the reproduction of designs having the exact physical characteristics of the die or mold used in the shaping procedure. The expenses incurred in providing large dies or molds and for time and labor expended in handling individual thermoplastic blanks render these prior processes and the products obtained therefrom relatively costly.

In accordance with the present invention I am able to employ a continuous sheet or roll of thermoplastic material in the production of a relatively inexpensive product of the class described which is far more flexible with respect to permissible design characteristics and structurally superior to products of a similar nature now available.

I have found that by subjecting a plasticized thermoplastic sheet or film to the action of pressure over a perforated support or molding element, the softened plastic material may be caused to flow into the perforations of the molding element to a depth which can be regulated or controlled by control of such factors as the degree of softness of the material, the degree and duration of pressure flow and the relative thickness of the plastic sheet. Thus, the flow of plasticized material into the perforations of the molding element may be controlled to provide a plastic sheet product which is merely indented in conformity with a predetermined pattern of the molding element or having perforations conforming thereto produced by permitting the indentations to rupture under the continued application of pressure.

To this end, a process of the invention comprises subjecting successive portions of a continuous sheet or film of thermoplastic material to the action of heat or a suitable plasticizer to render the material plastic, passing the plastic material over a suitable molding element perforated in accordance with a predetermined design, subjecting a surface of the thermoplastic sheet to the action of a pressure differential to cause the plasticized material to flow freely into the perforations of the molding element and removing the molded sheet from the molding element.

In carrying out my invention, I prefer to employ a perforated molding element which is made of metal or other suitable material of high heat conductivity to effect a reduction in the relative temperature of those portions of the plasticized material which come in contact with the solid surface of the molding element as distinguished from those portions of the material which are directly over the perforations or voids in the molding element. Thus, when heat is applied to the thermoplastic sheet in contact with the molding element sufficient heat will be absorbed by the element to provide a selective degree of plasticity of the material. In this manner, I am able to promote a maximum flow of plastic into the perforations of the molding element due to the greater plasticity of these portions of the thermoplastic sheet and only sufficient plasticity of the sheet where it contacts the relatively cool solid surfaces of the molding element to allow the material to mold itself to the slight irregularities of these surfaces.

The perforated molding element can be made of a variety of materials, and, depending on the effect desired, the perforations can be of many shapes and designs. The molding element may be made from a metal sheet having the perforated design stamped or otherwise cut from the sheet. A synthetic resin or plastic sheet may be employed which is not softened by the degree of heat required to plasticize the thermoplastic sheet, or the molding element may be formed of such material reinforced with fibre or fabric laminations.

In the production of simulated fabrics or woven materials, I prefer to employ a molding element formed of woven wire mesh. The type of wire and the character of the weave can be varied widely in accordance with the particular design desired in the finished product. While I prefer to use a metal wire mesh for the purpose mentioned, it will be readily appreciated that many other materials, such, for instance, as natural or synthetic fibre may be employed with equal effectiveness in forming the molding element.

In processing thermoplastic sheets which soften at relatively low temperatures or having the property of melting easily to a comparatively free flowing fluid state, the molding element can be precooled to a desired temperature before the thermoplastic sheet is placed on it. For sheets of thermoplastic material which do not soften readily at relatively low temperatures, I can heat the material before or after it is superimposed on the molding element or I can use the material in a semi-plastic state as it comes from the forming operation.

Any material which possesses the property of softening upon heating may be used in the production of the novel products of the present invention. Without restricting myself, I prefer to employ thermoplastic materials, such as, for example, cellulose esters e.g., cellulose acetate, cellulose propionate, cellulose butyrate; mixed esters of cellulose; cellulose ethers e.g., ethyl cellulose; nylon and polymeric materials e.g., polyvinyl alcohol, polyvinyl alcohol acetals, polyvinyl chloride, polyvinyl chloride acetate, polystyral, methyl methacrylate, polyethylene, and the like. Sheets made from such materials may be plasticized with suitable plasticizers, depending on the physical characteristics of the material employed. In some instances, particularly where the temperature required to obtain the desired degree of plasticity is relatively high, the sheet may be pre-softened before placing on the molding element with a suitable solvent which can be removed by evaporation extraction or other means during the molding operation or after the shaped sheet has been removed from the molding element.

The pressure applied to the thermoplastic sheet on the molding element may be any fluid pressure, such as, for instance, a pressure differential provided by creating and maintaining a degree of vacuum on the opposite side of the molding element from the thermoplastic blank or a positive pressure flow directed against the surface of the plastic sheet. The pressure transfer medium may be compressed air or other gas, steam, water or any other fluid which will not adversely affect the thermoplastic material. In the production of perforated sheet products, a sufficient volume of pressure flow should be maintained so that rupture of some of the identations will not prevent uniform perforation of the remaining indentations. The duration and degree of pressure flow may be regulated in accordance with the depth of indentations desired or to provide for uniform perforation of the indentations.

The pressure transfer medium may be heated to any desired temperature to facilitate shaping or molding of the thermoplastic material and to avoid premature chilling of the material as it is forced into the mold. Alternatively, when there is employed a thermoplastic material which melts easily to a comparatively free flowing fluid state, it is desirable to provide means for cooling the material before it is removed from the molding element and this may be readily accomplished by employing a cool pressure transfer medium in the molding operation. For most applications it is desirable to employ a heated pressure transfer medium and to provide additional cooling means to cool the molded thermoplastic material after it has been removed from the molding element. This sequence of operation will, of course, depend largely on the particular properties of the thermoplastic material used and its ability to retain the molded shape which is imparted to it while in the plastic shape. Plastics possessing a high degree of resiliency or which have a tendency to recover from the distortions of the shaped operation should be partially cooled to a quiescent state before removal from the molding element. Instead of employing the pressure transfer medium as the means for cooling the material during the molding operation, I may provide additional cooling means to fix the thermoplastic material in its molded form.

The above-mentioned and other features and objects of the invention and the manner of attaining them will become more apparent and the invention itself may be best understood by reference to the following description of a preferred apparatus for carrying out the invention taken in conjunction with the accompanying drawing, wherein.

Figure 1:
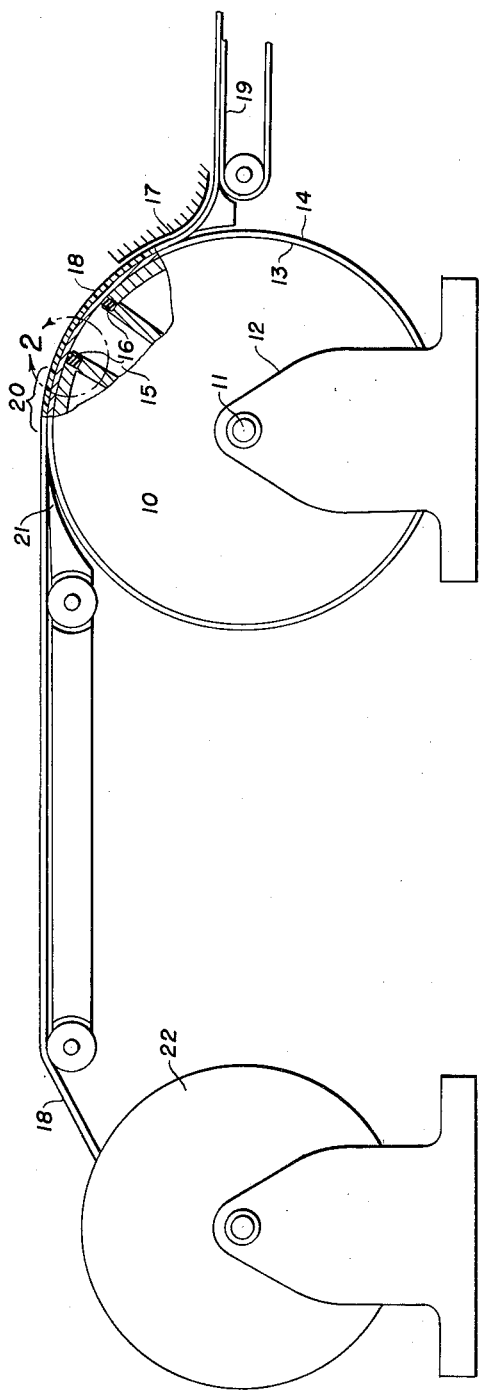
FIG. 1 is an elevational view of the apparatus partly in section.

With reference to FIG. 1 it will be seen that the apparatus comprises a stationary cylindrical drum 10 supported at each end of a centrally disposed axle 11 by means of suitable supports 12. The outer cylindrical surface 13 of drum 10 is preferably formed of high polished metal but may be of any other material having a relatively low coefficient of friction. The molding element 14 is mounted around surface 13 of drum 10 and is adapted to be rotated freely thereon. Element 14 may be formed as an integral unit adapted to be slipped on drum 10 from an end thereof or it may be wrapped around the drum and the ends secured in any suitable manner. For purposes of rotating element 14 a gear drive may be employed which is adapted to mesh with gearing provided on the element itself or a pulley drive may be connected to he molding element by means of caps provided on the ends thereof.

Figure 2:
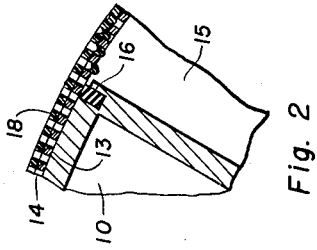
FIG. 2 is a detailed sectional view of a portion of the apparatus taken along the line 2—2 of FIG. 1.

In the specific embodiment illustrated in the drawings, I employ a vacuum chamber to create a pressure differential between the respective surfaces of the thermoplastic sheet to cause the plasticized sheet to flow into the perforations provided in molding element 14. With reference to FIGS. 1 and 2, the vacuum chamber 15 is positioned within drum 10 along the axis thereof and opens at the surface of the drum over a limited portion of its periphery in contact with the inner surface of molding element 14. In order to provide an effective seal of the leading and trailing edges of chamber 15, I provide identical strip gaskets 16 of rubber or other suitable material which extend slightly above the surface 13 of drum 10 against element 14. Chamber 15 which is hermetically sealed at all points except the peripheral opening on drum 10 may be evacuated by pumping equipment connected to the chamber in any suitable manner. A convenient exhaust port for the chamber 15 may be provided through the central axle 11 which may open into the chamber and be provided with a suitable coupling fitting on one end thereof.

Immediately adjacent the opening in chamber 15 and spaced from the opposite suface of molding element 14, I provide a heating unit 17 which extends over a portion of the periphery of drum 10. I prefer to employ an electric heater of the radiation type for unit 17 but it will be readily apparent that many different types of arrangement may be substituted for unit 17.

In operation, the thermoplastic sheet which has been designated in the drawings by reference numeral 18 may be fed directly from a casting belt 19 onto the rotating molding element 14 or may be first subjected to any of the preliminary treatments previously discussed above. Rotation of the molding element 14 causes the sheet 18 to pass beneath heater 17 where the material is plasticized and thence over vacuum chamber 15 which causes the thermoplastic material to flow uniformly into the design perforations provided in molding element 14.

In the region immediately following vacuum chamber 15 designated by numeral 20 in the drawing, the thermoplastic sheet molded in conformity with element 14 may be subjected to a cooling or fixing operation in accordance with the physical properties of the material employed. The molded sheet is then stripped from molding element 14 by means of a stripping device 21 disposed tangentially to element 14 and fed across the flat surface of 21 to a rotating rewind drum 22. Drum 22 is provided with an idler clutch arrangement to eliminate any possible strain on sheet 18 during the rewind operation.

Molding element 14 may be subjected to a continuous cooling treatment as it passes beneath the stripping device 21 and before it again contacts the thermoplastic sheet for another molding cycle.

The products of the invention are characterized by extremely fine design definition and a degree of flexibility substantially equivalent to that of genuine woven materials. The feature of providing for selective plasticity of the thermoplastic blank during the molding operation permits me to achieve the reproduction of delicate and intricate designs without substantially weakening the webbing or linkages between respective perforations of the design.

Novel effects can be realized by employing varied colored thermoplastic sheets or films superimposed on each other during the molding operation or by treating sheets or films of dissimilar material to effect coated or etched products.

The sheet products of the invention may be used in the production of manufactured products such as curtains, table cloths, bathing suits, shower curtains, baby pants, foundations, surgical tape and a wide variety of other products.

While I have described above the principles of my invention in connection with specific embodiments, it is to be clearly understood that this description is made only by way of example and not as limitations to the scope of my invention.

I claim:

A process for the manufacture of decorative thermoplastic sheet products which comprises subjecting successive portions of a continuous sheet of thermoplastic material to a uniform softening treatment, passing the softened thermoplastic material into contact with a continuously moving molding element perforated in accordance with a predetermined design, effecting selective plasticity of the sheet in contact with the molding element, subjecting a surface of the thermoplastic sheet to the action of a fluid pressure differential to cause the softened material to flow into the perforations of the molding element, maintaining the pressure differential to effect rupturing of the thermoplastic sheet in accordance with the perforations of the molding element, subjecting the soft molded thermoplastic sheet to a fixing treatment, and continuously removing molded portions of the thermoplastic sheet from the molding element.

References Cited in the file of this patent

UNITED STATES PATENTS

| | | |
|---|---|---|
| Re. 22,290 | Teague | Mar. 16, 1943 |
| Re. 23,910 | Smith et al. | Dec. 14, 1954 |
| 1,588,278 | Stenz | June 8, 1926 |
| 1,821,413 | Whitehouse | Sept. 1, 1931 |
| 2,032,923 | Eldridge | Mar. 3, 1936 |
| 2,032,935 | Hurt | Mar. 3, 1936 |
| 2,055,002 | Chandler | Sept. 22, 1936 |
| 2,161,308 | Murphy | June 6, 1939 |
| 2,219,578 | Pittenger | Oct. 29, 1940 |
| 2,354,916 | Hurt | Aug. 1, 1944 |
| 2,446,771 | Knowland | Aug. 10, 1948 |
| 2,493,439 | Braund | Jan. 3, 1950 |
| 2,518,565 | Nicolle | Aug. 15, 1950 |
| 2,567,275 | Colombo | Sept. 11, 1951 |
| 2,660,757 | Smith | Dec. 1, 1953 |